United States Patent
Wang et al.

(10) Patent No.: US 9,628,487 B2
(45) Date of Patent: Apr. 18, 2017

(54) SYSTEM AND METHOD FOR PARTIAL URL SIGNING WITH APPLICATIONS TO DYNAMIC ADAPTIVE STREAMING

(71) Applicant: Futurewei Technologies, Inc., Plano, TX (US)

(72) Inventors: Xin Wang, Rancho Palos Verdes, CA (US); Yongliang Liu, Beijing (CN); Shaobo Zhang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/667,396

(22) Filed: Mar. 24, 2015

(65) Prior Publication Data
US 2015/0271179 A1 Sep. 24, 2015

Related U.S. Application Data

(60) Provisional application No. 61/969,753, filed on Mar. 24, 2014.

(51) Int. Cl.
*G06F 21/10* (2013.01)
*H04L 29/06* (2006.01)
*G06F 21/44* (2013.01)

(52) U.S. Cl.
CPC ............ *H04L 63/10* (2013.01); *G06F 21/105* (2013.01); *G06F 21/44* (2013.01); *H04L 63/0846* (2013.01)

(58) Field of Classification Search
CPC ... H04L 63/10; H04L 63/0846; G06F 21/105; G06F 21/604
See application file for complete search history.

(56) References Cited

U.S. PATENT DOCUMENTS

| | | |
|---|---|---|
| 2011/0228775 A1 | 9/2011 | Lee et al. |
| 2012/0072731 A1 | 3/2012 | Winograd |
| 2012/0278467 A1 | 11/2012 | Schneider |
| 2013/0042100 A1 | 2/2013 | Bouazizi et al. |
| 2014/0156865 A1* | 6/2014 | Giladi ............... H04L 65/4084 709/231 |

(Continued)

FOREIGN PATENT DOCUMENTS

| | | |
|---|---|---|
| CN | 103297435 A | 9/2013 |
| WO | 2007103612 A2 | 9/2007 |
| WO | 2013152426 A1 | 10/2013 |
| WO | 2014012073 A1 | 1/2014 |

OTHER PUBLICATIONS

Brandenburg, RFC 6983, Jul. 2013, 45 pages.*

(Continued)

Primary Examiner — Oleg Korsak
(74) Attorney, Agent, or Firm — Conley Rose, P.C.

(57) ABSTRACT

A partial URL signing scheme for controlling access to content provided in adaptive streaming such as DASH is disclosed herein. Partial URL signing and verifying algorithms act as extensions to existing URL/URI signing techniques (e.g., IETF URI Signing). Partially signed URLs are signaled in an MPD and may take the form of a prefix, a suffix, or a substring of a URL. Individual segments of the content are requested by the client using URLs constructed based on a URL segment template with partial URL signing information provided as a query parameter for verification.

45 Claims, 6 Drawing Sheets

(56) References Cited

U.S. PATENT DOCUMENTS

2015/0350205 A1* 12/2015 Oyman ................ H04L 63/126
726/7

OTHER PUBLICATIONS

AWS "Amazon Simple Storage Service API Reference API Version Mar. 1, 2006", 414 pages.*
International Search Report, dated Jul. 1, 2015, PCT/US15/22317.
"Information Technology—Dynamic Adaptive Streaming over HTTP (DASH)—Part 1: Media Presentation Description and Segment Formats," ISO-IEC 23009-1, First Edition, Apr. 1, 2012, 134 pages.
Leung, "CDNI—URL Signing for HAS Content," Cisco, Jun. 28, 2012, 10 pages.
Leung, et al., "URI Signing for CDN Interconnection (CDNI)," draft-leung-cdni-uri-signing-05, Mar. 14, 2014, 35 pages.
Ni, et al., "Models for URL Signing and Validation in CDNI," draft-ni-cdni-url-signing-00.txt, Jul. 9, 2012, 10 pages.
"Information Technology—Dynamic Adaptive Streaming over HTTP (DASH)—Part 1: media Presentation Description and Segment Formats/Amd 2: Spatial Relationship Description and Generalized URL Parameters," ISO/IEC 23009-1, Amendment 2, Draft, Jan. 30, 2014, 11 pages.

* cited by examiner

Complete URL

Signed URL http://cdn1.example.com/video/500000/0.mp4v?size=medium

&Client=172.16.254.1&Expires=1357034400&Signature=nitfHRCrtziwO2 ⟵103  ⟵104  ⟵105

HwPfWw…QI6&KeyId=APKA9ONS7QCOWEXAMPL ⟵106  ⟵102

URL Template

Partial URLs

Signed partial URL http://cdn1.example.com/video/500000/&Partialness=prefix&Client=
172.16.254.1&Expires=1357034400&Signature=nitfHRCrtziwO2HwPfWw~
...QI6&KeyId=APKA9ONS7QCOWEXAMPL

SYSTEM AND METHOD FOR PARTIAL URL SIGNING WITH APPLICATIONS TO DYNAMIC ADAPTIVE STREAMING

CROSS-REFERENCE TO RELATED APPLICATIONS

The present application claims priority to provisional application Ser. No. 61/969,753, filed on Mar. 24, 2014, entitled "SYSTEM AND METHOD FOR PARTIAL URL SIGNING WITH APPLICATIONS TO DYNAMIC ADAPTIVE STREAMING" naming the same inventors as in the present application. The contents of the above referenced provisional application are incorporated by reference, the same as if fully set forth herein.

FIELD

Embodiments of the present invention generally relate to the field of content delivery. More specifically, embodiments of the present invention relate to URL signing for content delivery access control and validation.

BACKGROUND

Dynamic Adaptive Streaming over HTTP (DASH), also known as MPEG-DASH, is an approach to content streaming using conventional HTTP web servers equipped with Content Delivery Networks (CDNs). DASH divides content into a series of relatively small HTTP-based file segments as described in a Media Presentation Description (MPD), where the segments represent a very short interval of a content item that is potentially many hours in duration. The content may be provided at a variety of different bit rates, sizes, or qualities. When content is played back using a DASH client, the client automatically selects the next segment in the series to download and play. The size, quality, or bit rate of the selected segment may be chosen based on current network conditions and other factors (e.g., user preference). For example, the client may choose the segment having the highest bit rate that is supported by the underlying network without introducing buffering delay or stuttering.

In Web based content distribution, requests for content from client devices to content portals are typically in the form of content URLs (or more generally URIs). Very often content and service providers need to restrict access to content and limit viewing times in order to protect assets and fulfill licensing obligations, for example. Because URLs are inherently open, users, even those authenticated at the portal, can potentially share or expose content URLs with other unauthorized users, or pre-fetch or retain copies of these URLs to access the content outside of an authorized time interval. In other situations, illegal content aggregators can exploit these open URLs to aggregate and re-distribute content without adhering to terms of the original content portals.

URL signing is an effective mechanism for controlling access to URL-addressed content. In particular, URL signing can be used to restrict access to content components accessible via URLs, and control access to the components based on expiration dates and times that limit when content can be accessed.

To achieve these objectives, URL signing can append to a base URL with the following query parameter values:
1. a client IP address of the user for whom the content access is authorized,
2. an expiry timestamp to ensure that the content expires after a predetermined time, and
3. a digital signature over the base URL, the IP address and the timestamp.

These values can then be validated against an actual client sending in a URL request and the current time at a trusted party (e.g., content server) that is to validate and/or serve the request.

For example, the following is a base URL for a video segment "0.mp4v" having a bit rate of 50K bps with a query parameter size of "medium":
http://cdn1.example.com/video/500000/0.mp4v?size=medium It can be signed as follows, resulting in a signed URL:
http://cdn1.example.com/video/500000/0.mp4v?size=medium&Client=172.16.254.1&Expires=1357034400&Signature=nitfHRCrtziwO2HwPfWw~yYDhUF5EwRunQA-j19DzZrvDh6hQ731Dx~-ar3UocvvRQVw 6EkC~Gd-pGQyyOSKQim-TxAnW7d8F5Kkai9HVx0FIu-5jcQbOUEmatEXAMPLE3ReXySpLSMj0yCd3ZAB4UcBCAqEijkytL6f3fVYNGQI6&KeyId=APKA9ONS7QCOWEXAMPL
where the new query parameters Client, Expires, Signature, and KeyId constitute the URL signing information, and indicate a client IP address, an expiration date and time, a signature over the URL string, and an ID of the key used to create the signature, respectively.

Upon receiving a signed URL, validation can be carried out by a trusted party to determine if the actual request client is indeed the one specified by the Client field, the current time is not beyond the expiration time indicated by Expires, and the signature can be verified (e.g., using the key identified by KeyID). If any of these validations fails, the request is not legitimate and should be denied.

FIG. 1A illustrates an exemplary complete URL 101 comprising a base URL and a query string. The base URL is comprised of a protocol (e.g., HTTP, HTTPS, FTP, RTP, etc.), an address of a webserver, a directory path, and a file name. FIG. 1B illustrates an exemplary signed URL 102 based on the complete URL 101. The signed URL 102 comprises a base URL and a query string as before, and also includes signing information used for access control and/or verification purposes. The signing information comprises client string 103, expires value 104, signature string 105, and keyID string 106.

URL signing has been considered in the context of CDNs and Content Delivery Networks interconnection (CDNi). In CDNi deployment, a signed URL is assumed to be provided by a content service provider to a user client during website or content navigation. When trying to access content, the user's URL request is redirected by the Authoritative CDN and routed via a hierarchy of CDNs from the user client to a surrogate of the Delivering CDN, where the signed URL validation is made before content delivering. Different configurations in a CDNi hierarchy and signature key distribution result in different URL signing models and schemes. How and when to deliver the signed URLs for a large number of base URLs in an efficient and scalable manner make the direct application of URL signing to dynamic adaptive streaming over HTTP (DASH) using media presentation descriptions (MPD) considerably difficult.

The data model of an MPD is mainly described in terms of periods, adaptation sets, representations and segments. There are two basic ways to specify URLs for segments: Segment Lists and Segment Templates. Segment Lists enumerate a list of segment URLs, whereas Segment Templates provide a template-based URL construction mechanism which allows specification of a template containing specific identifiers that are substituted by dynamic values assigned to segments, to represent a list of segments.

Using a Segment Template is more compact and effective, especially when dealing with live streaming content which makes it infeasible to specify a (finite) list of segments at the time of MPD creation. For example, in the following Segment Template-based MPD reproduced in Table A, assuming that the first BaseURL element and the video Representation with id "v1" are selected, the template results in first the Representation-level segment template http://cdn1.example.com/video/50000/$Time$.mp4v.

TABLE A

```
<?xml version="1.0"?>
<MPD
    xmlns:xsi="http://www.w3.org/2001/XMLSchema-instance"
    xmlns="urn:mpeg:DASH:schema:MPD:2011"
    xsi:schemaLocation="urn:mpeg:DASH:schema:
    MPD:2011 DASH-MPD.xsd"
    type="dynamic"
    minimumUpdatePeriod="PT2S"
    timeShiftBufferDepth="PT30M"
    availabilityStartTime="2011-12-25T12:30:00"
    minBufferTime="PT4S"
    profiles="urn:mpeg:dash:profile:isoff-live:2011">
    <BaseURL>http://cdn1.example.com/</BaseURL>
    <BaseURL>http://cdn2.example.com/</BaseURL>
    <Period>
        <!-- Video -->
        <AdaptationSet
            mimeType="video/mp4"
            codecs="avc1.4D401F"
            frameRate="30000/1001"
            segmentAlignment="true"
            startWithSAP="1">
            <BaseURL>video/</BaseURL>
            <SegmentTemplate timescale="90000"
initialization="$Bandwidth%/init.mp4v"
media="$Bandwidth%/$Time$.mp4v"
                <SegmentTimeline>
                    <S t="0" d="180180" r="432"/>
                </SegmentTimeline>
            </SegmentTemplate>
            <Representation id="v0" width="320" height="240"
bandwidth="250000"/>
            <Representation id="v1" width="640" height="480"
bandwidth="500000"/>
            <Representation id="v2" width="960" height="720"
bandwidth="1000000"/>
        </AdaptationSet>
        <!-- English Audio -->
        <AdaptationSet mimeType="audio/mp4" codecs="mp4a.0x40"
lang="en" segmentAlignment="0" startWithSAP="1">
            <SegmentTemplate timescale="48000"
initialization="audio/en/init.mp4a" media="audio/en/$Time$.mp4a">
                <SegmentTimeline>
                    <S t="0" d="96000" r="432"/>
                </SegmentTimeline>
            </SegmentTemplate>
            <Representation id="a0" bandwidth="64000" />
        </AdaptationSet>
        <!-- French Audio -->
        <AdaptationSet mimeType="audio/mp4" codecs="mp4a.0x40"
lang="fr" segmentAlignment="0" startWithSAP="1">
            <SegmentTemplate timescale="48000"
initialization="audio/fr/init.mp4a" media="audio/fr/$Time$.mp4a">
                <SegmentTimeline>
                    <S t="0" d="96000" r="432"/>
                </SegmentTimeline>
            </SegmentTemplate>
            <Representation id="a0" bandwidth="64000" />
        </AdaptationSet>
    </Period>
</MPD>
```

The following segment URLs are then generated from the Representation-level segment template:

http://cdn1.example.com/video/500000/0.mp4v
http://cdn1.example.com/video/500000/180180.mp4v
http://cdn1.example.com/video/500000/360360.mp4v
http://cdn1.example.com/video/500000/540540.mp4v
http://cdn1.example.com/video/500000/720720.mp4v However, this Segment Template mechanism makes it difficult to conduct URL signing for segment URLs that are not explicitly specified by an MPD at the time when the MPD is created. Moreover, for the same reasons, it is not feasible to carry signed URLs for segments in the MPD itself, especially for live streaming content.

Because URLs of DASH (media) segments used by CDNs are often specified using segment templates within an MPD, it is not presently feasible to implement URL signing directly for segments, nor to signal and carry signed URLs in an MPD. URL signing is not suitable in its native form to control access to individual segments referenced by URLs. The specification of individual segments using segment templates that enables the client to construct segment URLs at the time of streaming with potential dynamic adaptation makes it infeasible to sign every segment URL when creating an MPD that specifies the segment template, or to distribute these URL signatures to clients efficiently.

SUMMARY

Embodiments of the present invention provide partial URL signing for controlling access to content provided using DASH. Partial URL signing and verifying algorithms are provided herein and act as extensions to existing URL/URI signing techniques (e.g., IETF URI Signing). Partially signed URLs are specified and signaled in an MPD and may take the form of a prefix, a suffix, or a sub-string of a URL. Individual segments of the content are requested by the client using a URL constructed based on a URL segment template with partial URL signing information provided as a query parameter.

According to one embodiment, a method for authorizing a request for content is disclosed. The method includes receiving a request for content comprising a URL and signing information, where the content is stored in memory and the signing information includes a partial URL, a partialness parameter, and an access control query string. The partialness parameter indicates if the partial URL is a prefix, suffix, or substring of the requested segment URL. The partialness of the partial URL is verified against the URL based on the value of the partialness parameter. The request is verified based on the signing information, and access to the content is provided for a party associated with the request when the partialness is verified and the signing information is verified.

According to other embodiments, an apparatus for providing access control for a collection of content items is disclosed. The apparatus includes a memory configured to store a request for content, and a processor configured to distribute a file including a URL template for generating URLs for the content items to a requesting client associated with the request for content. The URL template comprises signing information for verifying the request for the content items, and the signing information comprises a partial URL, a partialness parameter, and an access control query string. The signing information is used to verify the URL requests for the content items and authorizing access to the content items for the requesting client.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 3 is a diagram illustrating an exemplary signed partial URL according to embodiments of the present invention.

DETAILED DESCRIPTION

Figures 1A, 1B:
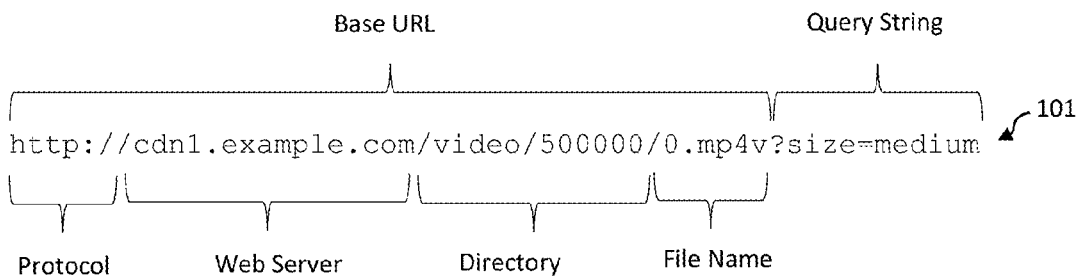
FIG. 1A is diagram illustrating an exemplary complete URL.
FIG. 1B is a diagram illustrating an exemplary signed URL according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Embodiments are well suited to performing various other steps or variations of the steps recited in the flowchart of the figures herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a wireless network or electronic computing device that manipulates and transforms data represented as physical (electronic) quantities within the system's registers and memories into other data similarly represented as physical quantities within the system memories or registers or other such information storage, transmission or display devices.

Embodiments of the present invention provide partial URL signing for controlling access to content provided using DASH. Partial URL signing and verifying algorithms are provided herein and act as extensions to existing URL/URI signing techniques (e.g., IETF URI Signing). Partially signed URLs are defined in an MPD and may take the form of a prefix, a suffix, or a sub-URL. Individual segments of the content are requested by the client using a URL constructed based on the URL segment template with partial URL signing information provided as a query parameter. As used herein, the term "URL" refers specifically to a uniform resource locator, and it can be changed to a more general Uniform Resource Identifier (URI) for some embodiments of the present invention.

The techniques disclosed herein offer several key advantages over existing techniques, and are compatible with current DASH applications, as well as future content delivery techniques contemplated by IETF CDNi. Authentication and access control are enabled for a collection of content items (e.g., streaming segments), where each item is associated with a URL. It is possible to sign the URL once, and then verify the signature for each and every URL request to control access to a collection of content items, items from different domains, or items using different protocols. The described URL signing techniques use a compact form that does not alter client URL access workflow. The disclosed techniques can also be used for selective ranges of content items, where one or more range parameters are provided as part of a signed message.

The approaches to partial URL signing disclosed herein address issues caused by the non-deterministic nature of segment URLs and MPD carriage issues caused by the use of segment templates in DASH. From a content and service provider's point of view, it is not necessary to perform different access control for streaming content at the individual segment level in practice. Access control is typically performed at the representation, adaptation set or period level in MPD data structure terms. For example, access control is often performed at one of the following content granularity levels:

Content quality: a high definition or high bitrate version (or representation) of the content requires access control, but a standard definition (or low bitrate) version does not require access control. Versions of content with different qualities are defined using representations in an MPD.

Media type: a video portion of the content requires access control, but an audio portion of the content does not require access control. Content of different media types are defined using adaptation sets in an MPD.

Content type: a main program or feature of the content requires access control, but a commercial embedded within or associated with the content does not require access control. Content of different program types are defined using periods in an MPD.

In addition, access control for streaming content should be persistent regardless of what protocols and which CDN/CDNi nodes are used to deliver the content. To achieve the objectives of URL signing (e.g., who can have access to streaming content and for how long), it may be sufficient to consider partial URL signing (e.g., signing only a portion of a URL) for content accessed using DASH.

According to some embodiments of the present invention, a partial URL signing scheme is disclosed that specifies a generic algorithm used to generate a digital signature over a portion of a base URL, information to be included in a partially signed URL for identifying the signature, and a generic algorithm used to validate access requests for the content referenced by the partially signed URL. The partial URL signing scheme can be implemented by a signer that generates partially signed URLs, a client that requests content referenced by partially signed URLs, and a verifier that checks the validity of access requests from the client for content referenced by the partially signed URLs.

Partial URLs

Figure 2A:
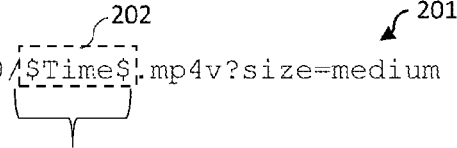
FIG. 2A is a diagram illustrating an exemplary URL Template according to embodiments of the present invention.

With regard to FIG. 2A, an exemplary URL Template 201 is depicted according to embodiments of the present invention. The URL Template includes a $Time$ variable 202 as part of the base URL portion. The base URL may contain query parameters with static and dynamic values. These situations are treated similarly to URLs without query parameters when considering query parameters as multiple individual strings.

Figure 2B:
FIG. 2B is a diagram illustrating exemplary partial URLs based on a URL Template according to embodiments of the present invention.
Figure 2B:
Figure 2B:

With regard to FIG. 2B, exemplary partial URLs 203-205 based on URL Template 201 are depicted according to embodiments of the present invention. A partial URL is a portion (e.g., a prefix, suffix, or substring) of a complete URL. In this case, the complete URL is referred to as the base URL. A partial URL is a prefix, a suffix, or a substring of the base URL. Partial URL 203 is a prefix of base URL 201, partial URL 204 is a suffix of base URL 201, and partial URL 205 is a substring of base URL 201.

An exemplary base URL is depicted as:
http://cdn1.example.com/video/500000/0.mp4v A partial URLs is a prefix URL based on the base URL:
http://cdn1.example.com/video/500000/

Using a prefix URL allows access control over all URLs that extend the end (right side) of the URL, especially alternative underneath paths, components and query strings. For example, the following URLs can be generated using the partial prefix URL 203:
http://cdn1.example.com/video/500000/0.mp4v
http://cdn1.example.com/video/500000/1.mp4v
http://cdn1.example.com/video/500000/720/2.mp4v
http://cdn1.example.com/video/500000/720/3.mp4v?size=phone The following exemplary partial URL is a suffix URL based on the base URL:
example.com/video/500000/0.mp4v.

This suffix allows access control over all portal URLs that extend from the head (left side) of the URL, especially alternative domain names (e.g., CDN nodes) and protocols (e.g., HTTPS, RTP). For example, the following URLs can be generated using the partial suffix URL described above:
http://cdn1.example.com/video/500000/0.mp4v
http://cdn2.example.com/video/500000/0.mp4v
https://cdn1.example.com/video/500000/0.mp4v
rtp://cdn1.example.com/video/500000/0.mp4v The following exemplary partial URLs is a substring of the base URL:
example.com/video/500000/.

This substring allows access control over all URLs that extends it at both head and end. For example:
http://cdn4.example.com/video/500000/0.mp4v
http://cdn3.example.com/video/500000/1.mp4v
https://cdn2.example.com/video/500000/2.mp4v
rtp://cdn1.example.com/video/500000/3.mp4v Partial URL Signing Partial URL signing is similar to URL signing. However, partial URL signing signs over a partial URL (e.g., a portion of a URL), and the signature information may contain additional information, such as a partialness parameter that indicates how the partial URL is related to its base URL. For example, the partialness parameter may have a value including "prefix", "suffix" or "substring", to indicate that the partial URL is a prefix, suffix, or substring of the base URL. According to some embodiments, when the partialness parameter is not included, either traditional URL signing is performed by default or a preferred value (e.g., "prefix") of the partialness parameter is selected by default.

A URL signing algorithm can be extended to a partial URL signing algorithm. Given a partial URL L with an optional partialness parameter value P, an access control query string C, and a key information parameter K, the partial URL signature S and signing information I are determined as follows:

A. If a partialness parameter is not present, or P indicates that L is not a partial URL (e.g., L is a base URL), then S and I are determined based on an underlying URL signing.

B. If a partialness parameter is present (or when omitted but present by default) and indicates that L is a partial URL, then S=sign[L, P, C, K], where sign is the URL signing algorithm, and

I=L & P & C & S & K.

According to some embodiments, to generate and validate signed partial URLs, a set of private and public keys are shared between a URL signer and a validating entity. Symmetric and asymmetric keys can be used for this purpose. For symmetric key URL signing, the same private key is adopted for both signature generation and validation. For asymmetric key URL signing, a key pair consisting of a public key and private key is used, where the private key is used for signing and the public key is used for validation.

Using the partial URL examples of prefix, suffix, and sub-URLs discussed above, the following examples of partial URL signing information I can be constructed, where PartialURL is the parameter name for the partial URL to be signed. The binary encoded values shown below are only for illustration purposes.

http://cdn1.example.com/video/500000/
PartialURL="http://cdn1.example.com/video/500000/"&Partialness=prefix&Client=172.16.254.1&Expires=1357034400&Signature=nitfHRCrtziwO2HwPfWw~yYDhUF5EwRunQA-j19DzZrvDh6hQ731Dx~-ar3UocvvRQVw6EkC~GdpGQyyOSKQim-TxAnW7d8F5Kkai9HVx0FIu-5jcQb0UEmatEXAMPLE3ReXySpLSMj0yCd3ZAB4UcBCAqEijkytL6f3fVYNGQI6&KeyId=APKA9ONS7QCOWEXAMPL example.com/video/500000/0.mp4v
   PartialURL="example.com/video/500000/0.mp4v"
     &Partialness=suffix&Client=172.16.254.1&
     Expires=1357034400&Signature=nitfHRCrtziw
     O2HwPfWw~yYDhUF5EwRunQA-
     j19DzZrvDh6hQ731Dx~-ar3Uocvv
     RQVw6EkC~GdpGQyyOSKQim-
     TxAnW7d8F5Kkai9HVx0FIu-
     5jcQb0UEmatEXAMPLE3ReXySpLSMj0yCd3
     ZAB4UcBCAqEijkytL6f3fVYNGQI6&KeyId=
     APKA9ONS7QCOWEXAMPL
example.com/video/500000/
   PartialURL="example.com/video/500000/
     "&Partialness=substring&Client=172.16.254.1&
     Expires=1357034400&Signature=nitfHRCrtziw
     O2HwPfWw~yYDhUF5EwRunQA-
     j19DzZryDh6hQ731Dx~-ar3Uocvv
     RQVw6EkC~GdpGQyyOSKQim-
     TxAnW7d8F5Kkai9HVx0FIu-5jcQb0UEmat
     EXAMPLE3ReXySpLSMj0yCd3ZAB4UcBCAq
     EijkytL6f3fVYNGQI6&KeyId=APKA9ONS7
     QCOWEXAMPL With regard to FIG. 3, an exemplary signed partial URL 301 is depicted according to embodiments of the present invention. Signed partial URL 301 comprises partial URL 302, partialness parameter 303, an access control query string comprising a client parameter 305 and an expiry parameter 305, a signature 306, and a keyID 307. Signature 306 is depicted in an abridged format for purposes of illustration. There can be different variations in what parameters are actually used in a special implementation of signed partial URLs. For instance, the expiry parameter may be changed to two time instance parameters, "beginning" and "end", to indicate a validity time interval, and the keyID parameter may be changed to a different parameter (e.g., a public key, a certificate or an identification) for identifying a key used for signing or validation. According to some embodiments, specific stream or content properties, such as bit rate or resolution, can be signed and included in the signing information.

Partial URL Verifying

Partial URL verifying (or verification) is a process that checks partial URL signing information against an actual URL request with trusted and/or verifiable information (e.g., a client's IP address, date and time information). Additionally, partial URL verifying will determine if the partial URL included in the signing information describes a partialness relationship with the requested URL. For example, if the partialness value is "prefix", the partial URL will be checked against the actual request URL to determine if the former is a prefix of the latter.

Segments, representations, adaptation sets, and periods defined in an MPD represent a collection of content components that can be signed to generate pieces of partial URL signing information. These pieces of URL signing information can then be defined within MPDs and distributed to clients that are authorized to access the content components. After a client constructs a URL from a segment template, or selects a URL from a segment list, the client appends the URL with the client's partial URL signing information to generate a partially signed URL. The partially signed URL is used to make a content request. This allows the partially signed URL to be verified for the purpose of granting or denying access (e.g., access control) to the requesting client for the segment referenced by the URL.

Figure 4:
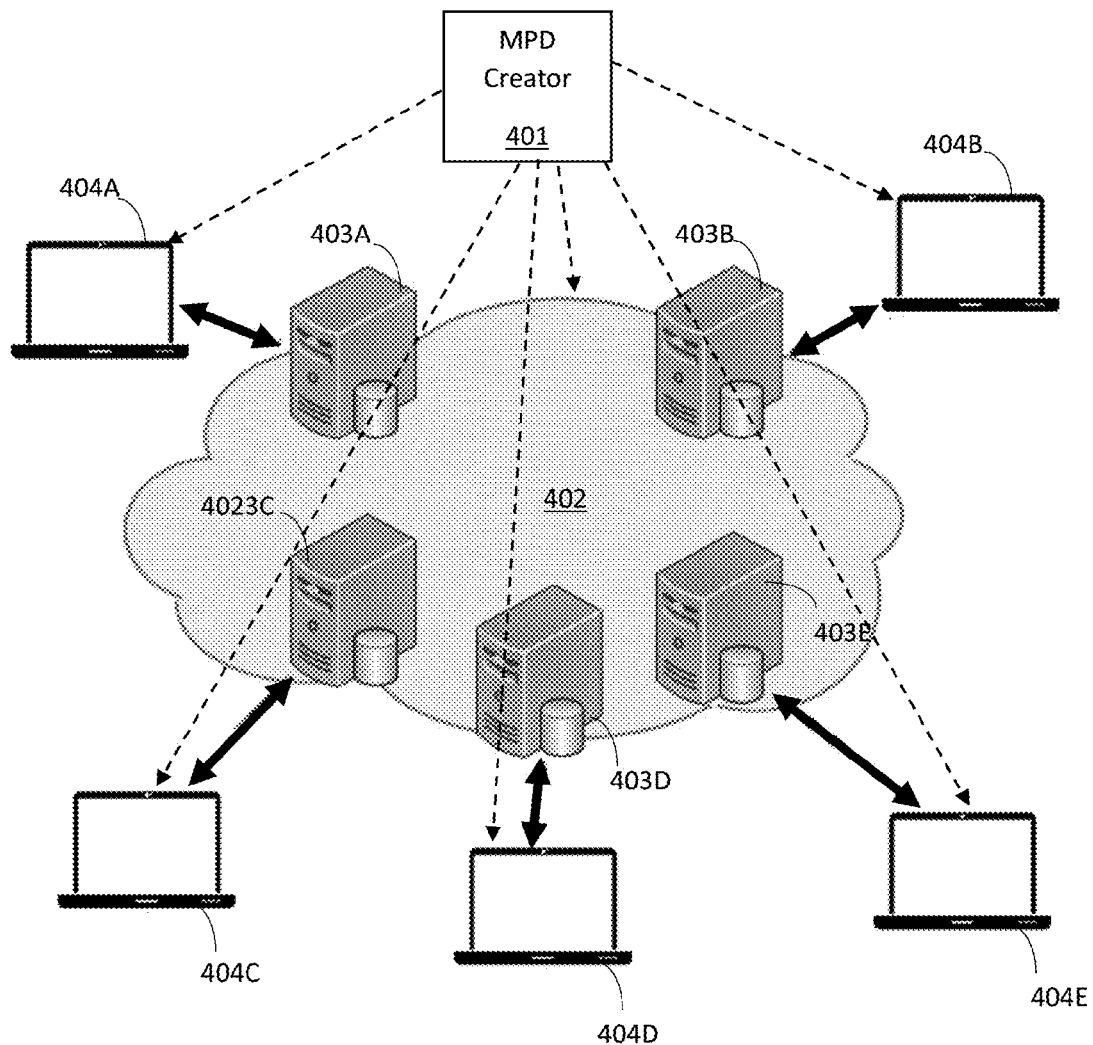
FIG. 4 is a diagram illustrating an exemplary CDN and exemplary streaming clients according to embodiments of the present invention.

In a DASH system (e.g., compliant to MPEG DASH), streaming content is described in a manifest document, called media presentation description (MPD), and there are usually parties in the roles of MPD Creator (MC), Content Distributor (CD) and Streaming Client (SC). With regard to FIG. 4, an exemplary CDN 402 is depicted according to embodiments of the present invention. CDN 402 is configured to store media content (e.g., DASH media segments) and respond to authorized requests for content. An MC can be the original server that prepares streaming content (e.g., content servers 403A-403E) or a specific device (e.g., MPD Creator 401) that creates and/or distributes MPDs to clients 404A-404E. A CD can be the original server that hosts streaming content or a CDN/CDNi node (e.g., content servers 403A-403E) that delivers content on the behalf of the original server. Clients 404A-404E access streaming content according to an MPD and may perform dynamic adaption in selecting which segments from which representations in which adaptation sets to make requests, according to factors such as network bandwidth, content quality, power consumption, etc.

Figure 5:
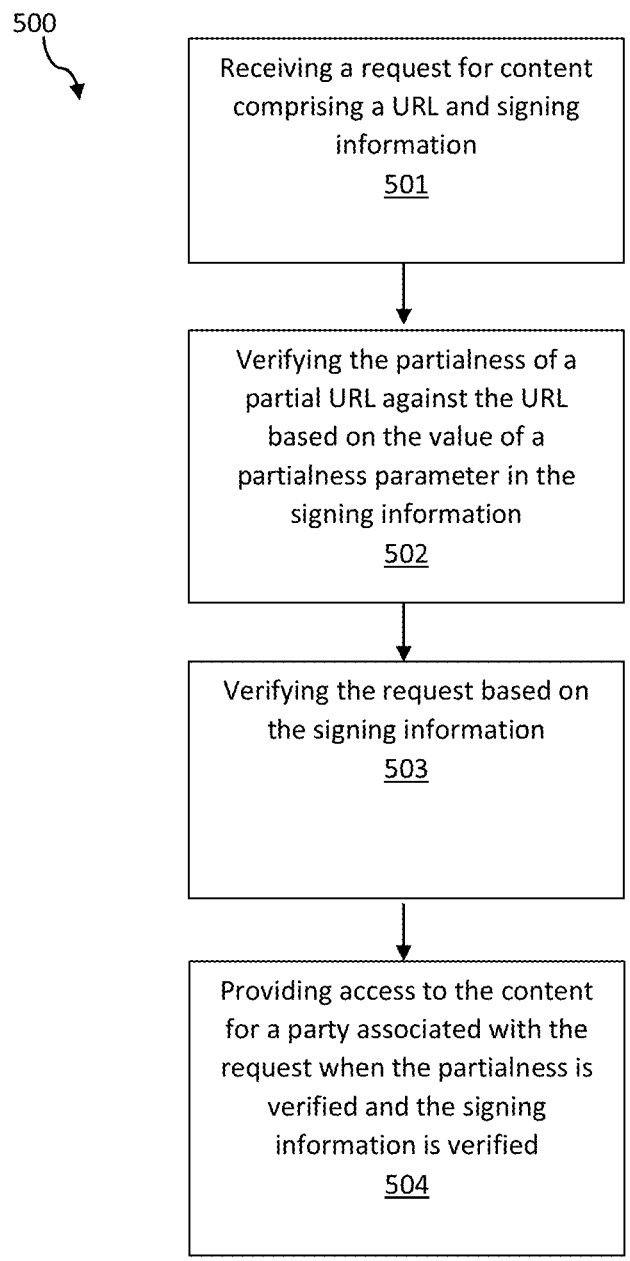
FIG. 5 is a flow chart depicting an exemplary sequence of computer implemented steps for authorizing a request for content in a content delivery network according to embodiments of the present invention.

With regard to FIG. 5, a flow chart illustrating an exemplary sequence of computer implemented steps 500 for authorizing a request for content is depicted according to embodiments of the present invention. A request for content comprising a URL and signing information is received at step 501. The signing information comprises a partial URL, a partialness parameter, and an access control query string. At step 502, the partialness (e.g., prefix, suffix, or substring) is verified on the partial URL against the URL based on the value of the partialness parameter. According to some embodiments, the partial URL is considered a base URL when the partialness parameter is omitted, or a prefix of the base URL by default when it is not present. At step 503, the request is verified based on the signing information. According to some embodiments, the singing information includes a signature and a key ID, and the signature is generated using a signing algorithm based on the partial URL, the partialness parameter, the access control query string, and the key ID. At step 504, access to the content is authorized for a party associated with the request when the partialness is verified and the signing information is verified.

One approach to signal and carry partial URL signing information is to use a parital URL signing attribute within an MPD. A new attribute @pURLSigning is introduced to the Representation, Adaptation Set and Period elements, to carry a partial URL signing information value. After the client constructs a URL from a segment URL template, or selects a URL from a segment URL list, the client appends the signing information to the end and issues a request using the appended URL. This appended URL allows the constructed or selected URL to be verified against the partial URL signing information contained in the associated MPD.

Table I depicts an exemplary MPD with a new attribute @pURLSigning, where video segments in Representations "v1" and "v2" have partial URL signing information and are subject to access control. The partial URL signing information comprises a partialness parameter, an access control query string including a client value and an expiry value, and a signature. Video segments in Representation "v0" have no partial URL signing and are not subject to access control.

Table I

```xml
<?xml version="1.0"?>
  <MPD
    xmlns:xsi="http://www.w3.org/2001/XMLSchema-instance"
    xmlns="urn:mpeg:DASH:schema:MPD:2011"
    xsi:schemaLocation="urn:mpeg:DASH:schema:MPD:2011 DASH-MPD.xsd"
    type="dynamic"
    minimumUpdatePeriod="PT2S"
    timeShiftBufferDepth="PT30M"
    availabilityStartTime="2011-12-25T12:30:00"
    minBufferTime="PT4S"
    profiles="urn:mpeg:dash:profile:isoff-live:2011">
    <BaseURL>http://cdn1.example.com/</BaseURL>
    <BaseURL>http://cdn2.example.com/</BaseURL>
    <Period>
       <!-- Video -->
       <AdaptationSet
         mimeType="video/mp4"
         codecs="avc1.4D401F"
         frameRate="30000/1001"
         segmentAlignment="true"
         startWithSAP="1">
         <BaseURL>video/</BaseURL>
         <SegmentTemplate timescale="90000"
initialization="$Bandwidth%/init.mp4v"
media="$Bandwidth%/$Time$.mp4v">
            <SegmentTimeline>
               <S t="0" d="180180" r="432"/>
            </SegmentTimeline>
         </SegmentTemplate>
         <Representation id="v0" width="320" height="240"
bandwidth="250000"/>
         <Representation id="v1" width="640" height="480"
bandwidth="500000"
pURLSigning="PartialURL="http://cdn1.example.com/video/500000/"&P
artialness=prefix&Client=172.16.254.1&Expires=1357034400&Signatur
e=nitfHRCrtziwO2HwPfWw~yYDhUF5EwRunQA-j19DzZrvDh6hQ731Dx~-
ar3UocvvRQVw6EkC~GdpGQyyOSKQim-TxAnW7d8F5Kkai9HVx0FIu-
5jcQbOUEmatEXAMPLE3ReXySpLSMj0yCd3ZAB4UcBCAqEijkytL6f3fVYNGQI6&Ke
yId=APKA9ONS7QCOWEXAMPL"/>
         <Representation id="v2" width="960" height="720"
bandwidth="1000000"
pURLSigning="PartialURL="http://cdn1.example.com/video/1000000/"&
Partialness=prefix&Client=172.16.254.1&Expires=1357034400&Signatu
re=nitfHRCrtziwO2HwPfWw~yYDhUF5EwRunQA-j19DzZrvDh6hQ731Dx~-
ar3UocvvRQVw6EkC~GdpGQyyOSKQim-TxAnW7d8F5Kkai9HVx0FIu-
5jcQbOUEmatEXAMPLE3ReXySpLSMj0yCd3ZAB4UcBCAqEijkytL6f3fVYNGQI6&Ke
yId=APKA9ONS7QCOWEXAMPL"/>
       </AdaptationSet>
       <!-- English Audio -->
       <AdaptationSet mimeType="audio/mp4" codecs="mp4a.0x40"
lang="en" segmentAlignment="0" startWithSAP="1">
         <SegmentTemplate timescale="48000"
initialization="audio/en/init.mp4a" media="audio/en/$Time$.mp4a">
            <SegmentTimeline>
               <S t="0" d="96000" r="432"/>
            </SegmentTimeline>
         </SegmentTemplate>
         <Representation id="a0" bandwidth="64000" />
       </AdaptationSet>
       <!-- French Audio -->
       <AdaptationSet mimeType="audio/mp4" codecs="mp4a.0x40"
lang="fr" segmentAlignment="0" startWithSAP="1">
         <SegmentTemplate timescale="48000"
initialization="audio/fr/init.mp4a" media="audio/fr/$Time$.mp4a">
            <SegmentTimeline>
               <S t="0" d="96000" r="432"/>
            </SegmentTimeline>
         </SegmentTemplate>
         <Representation id="a0" bandwidth="64000" />
       </AdaptationSet>
    </Period>
  </MPD>
```

Partial URL Signing Descriptors

Partial URL signing information takes the form of URL query parameters, and these query parameters can be inserted using a generic descriptor mechanism. In another approach for signaling signed partial URLs, a media segment URL is created by inserting parameters into a query string portion of the URL rather than substituting parameters in the path portion of the URL. URL parameter information may be specified to allow both static and dynamic URL parameter insertions or substitutions. Various types of parameters including parameters from other namespaces, optional and mandatory parameters, and/or query request parameters may be inserted. Processing rules may also be applied to construct URLs based on specified URL parameter information. Inserting parameters into the query string portion allows a streaming server to manage or control adaptive streaming, e.g., by having the server rather than client determine which representation and/or segments to select for the media content streaming. The server managed adaptive streaming (SMAS) approach may bring about various benefits such as improving consistency of client experiences.

Figure 6:
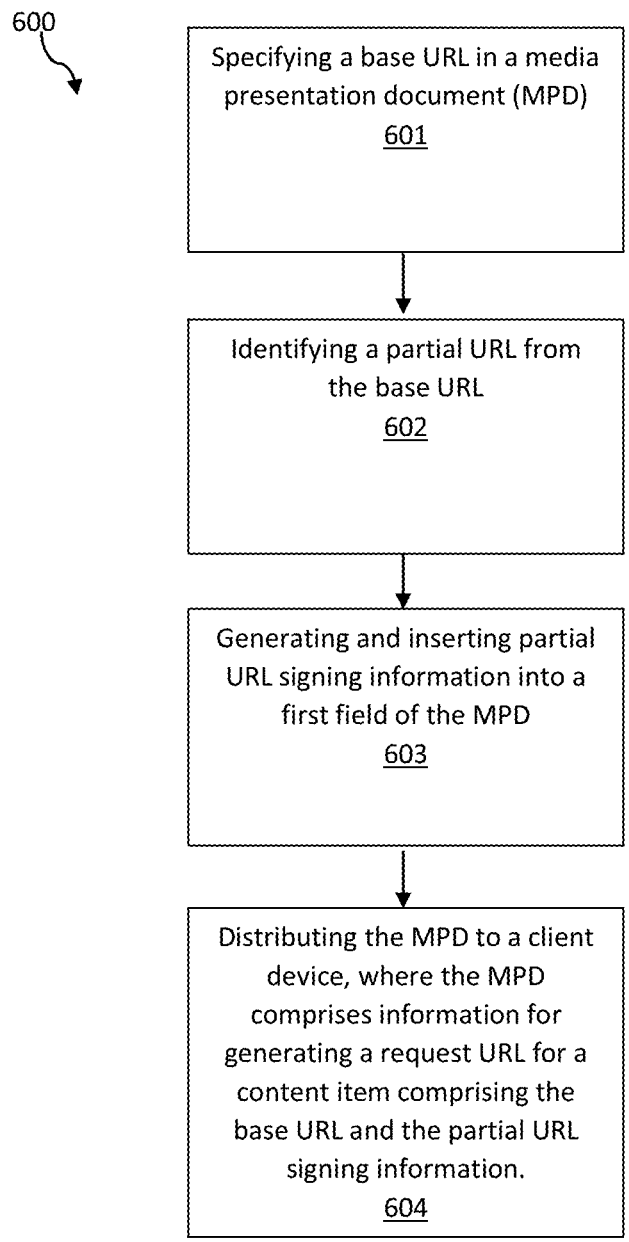
FIG. 6 is a flow chart depicting an exemplary sequence of computer implemented steps for signing a partial URL according to embodiments of the present invention.

With regard to FIG. 6, a flow chart illustrating an exemplary sequence of computer implemented steps 600 for distributing a signed partial URL is depicted according to embodiments of the present invention. At step 601, a base URL is specified in an MPD. A partial URL (e.g., a prefix, suffix, or substring) of the base URL is identified at step 602. At step 603, partial URL signing information is generated and inserted into a field of the MPD. The partial URL signing information includes the partial URL, a partialness parameter, and an access control query string. According to some embodiments, the field is a representation, an adaptation set, or a period element of the MPD. At step 604, the MPD is distributed to a client device. The distributed MPD comprises information for generating a request URL, and the request URL comprises the based URL and the partial URL signing information for accessing a content item.

Although exemplary embodiments of the present disclosure are described above with reference to the accompanying drawings, those skilled in the art will understand that the present disclosure may be implemented in various ways without changing the necessary features or the spirit of the present disclosure. The scope of the present disclosure will be interpreted by the claims below, and it will be construed that all techniques within the scope equivalent thereto belong to the scope of the present disclosure.

What is claimed is:

1. A method for authorizing a request for content comprising:
   receiving a request for content comprising a Uniform Resource Locator (URL) and signing information, wherein the content is stored in memory and the signing information comprises a partial URL, a partialness parameter, and an access control query string;
   verifying a partialness of the partial URL against the URL based on a first value of the partialness parameter;
   verifying the request based on the signing information; and
   providing access to the content for a party associated with the request when the partialness is verified and the signing information is verified.

2. The method of claim 1, wherein the signing information further comprises a signature and a key identifier (ID), and the signature is generated using a signing algorithm based on the partial URL, the partialness parameter, the access control query string, and the key ID.

3. The method of claim 2, wherein the key ID corresponds to a private key used to generate the signature, and a public key used to verify the request.

4. The method of claim 1, wherein the URL is generated using a URL template stored in a media presentation description (MPD).

5. The method of claim 1, wherein the URL is selected from a segment URL list defined in a media presentation description (MPD).

6. The method of claim 4, wherein the content is a Dynamic Adaptive Streaming over Hypertext Transfer Protocol (DASH) media segment stored in a content delivery network (CDN) node.

7. The method of claim 1, wherein the access control query string comprises an Internet Protocol (IP) address.

8. The method of claim 1, wherein the access control query string comprises a media access control (MAC).

9. The method of claim 1, wherein the signing information further comprises a second value representing a time that authorization will expire.

10. The method of claim 1, wherein the signing information further comprises a content property that is used to verify the request.

11. The method of claim 10, wherein the content property comprises at least one of a bitrate, a resolution and a quality level.

12. The method of claim 1, wherein the signing information is verified by a trusted party.

13. The method of claim 1, wherein the partialness parameter is verified by using the partial URL as a base URL when the partialness parameter is omitted.

14. The method of claim 1, wherein the signing information further comprises a range value representing a plurality of sequential segments.

15. An apparatus for providing access control for a collection of content items, the apparatus comprising:
   a memory configured to store a request for content; and
   a processor configured to distribute a file comprising a Uniform Resource Locator (URL) template for generating URL requests for the content items to a requesting client associated with the request for content, and signing information for verifying the URL requests for the content items and authorizing access to the content items for the requesting client,
   wherein the signing information comprises a partial URL, a partialness parameter, and an access control query string.

16. The apparatus of claim 15, wherein the signing information further comprises a signature and a key identifier (ID), and the signature is generated using a signing algorithm based on the partial URL, the partialness parameter, the access control query string, and the key ID.

17. The apparatus of claim 16, wherein the key ID corresponds to a private key used to generate the signature, and a public key used to verify the request.

18. The apparatus of claim 15, further comprising verifying the partialness parameter based on the partial URL being a prefix, suffix, or substring of the URL.

19. The apparatus of claim 15, wherein the request comprises a content property.

20. The apparatus of claim 19, wherein the content property comprises at least one of a bitrate, a resolution and a quality level.

21. The apparatus of claim 20, wherein the content property adapts to a network condition, and the network condition comprises at least one of a bandwidth and a power consumption rate.

22. The apparatus of claim 15, wherein the file is a media presentation description (MPD).

23. The apparatus of claim 15, wherein the partialness parameter is verified by considering the partial URL as a base URL when the partialness parameter is omitted.

24. The apparatus of claim 15, wherein the request is verified by a trusted party.

25. The apparatus of claim 15, wherein the signing information further comprises a range value representing a plurality of sequential segments.

26. The apparatus of claim 16, wherein the access control query string comprises a client value and an expiration time.

27. A method for generating a request Uniform Resource Locator (URL) with partial URL signing information comprising:
- specifying a base URL in a media presentation document (MPD);
- identifying a partial URL from the base URL;
- generating partial URL signing information comprising the partial URL, a partialness parameter, and an access control query string;
- inserting the partial URL signing information into a first field of the MPD; and
- distributing the MPD to a client device, wherein the MPD comprises information for generating a request URL for a content item, and the request URL comprises the base URL and the partial URL signing information.

28. The method of claim 27, further comprising verifying the request URL using the partial URL signing information and authorizing access to a Dynamic Adaptive Streaming over Hypertext Transfer Protocol (DASH) media segment associated with the request URL for the client device.

29. The method of claim 27, wherein the partial URL signing information further comprises a signature and a key identifier (ID), and the signature is generated using a signing algorithm based on the partial URL, the partialness parameter, the access control query string, and the key ID.

30. The method of claim 29, wherein the key ID corresponds to a private key used to generate the signature and a public key used to verify the request URL.

31. The method of claim 27, wherein the access control query string comprises an Internet Protocol (IP) address.

32. The method of claim 27, wherein the partial URL signing information further comprises a value representing a time that authorization will expire.

33. The method of claim 27, wherein the partial URL signing information further comprises a content property that is used to verify the request URL.

34. The method of claim 33, wherein the content property comprises at least one of a bitrate, a resolution and a quality level.

35. The method of claim 27, wherein the signing information is verified by a trusted party.

36. The method of claim 27, wherein the partial URL comprises a prefix, suffix, or substring of the base URL.

37. The method of claim 27, wherein the first field of the MPD comprises at least one of a representation, an adaptation set, and a period element.

38. The method of claim 27, wherein the partial URL signing information is inserted into a query string of the base URL.

39. The method of claim 27, further comprising substituting the URL signing information into a path portion of the base URL to generate the request URL.

40. The method of claim 27, wherein a portion of the request URL is generated using a segment template.

41. The method of claim 27, wherein a portion of the request URL is selected from a segment URL list.

42. The method of claim 27, wherein the base URL comprises query parameters with static and dynamic values.

43. The method of claim 27, wherein the base URL comprises a variable.

44. The method of claim 27, wherein the partial URL signing information comprises query parameters that are inserted into the request URL using a generic descriptor mechanism.

45. The method of claim 27, wherein the access control query string comprises a MAC address.

* * * * *

UNITED STATES PATENT AND TRADEMARK OFFICE
CERTIFICATE OF CORRECTION

PATENT NO. : 9,628,487 B2  
APPLICATION NO. : 14/667396  
DATED : April 18, 2017  
INVENTOR(S) : Xin Wang et al.

It is certified that error appears in the above-identified patent and that said Letters Patent is hereby corrected as shown below:

In the Claims

Column 14, Lines 1-4, Claim 6, should read:
6. The method of Claim 4, wherein the content is a Dynamic Adaptive Streaming over Hypertext Transfer Protocol (DASH) media segment stored in a content delivery network (CDN) node.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*